United States Patent [19]

Nakashima et al.

[11] 4,034,246

[45] July 5, 1977

[54] VARIABLE VIBRATING MOTOR

[76] Inventors: Akinobu Nakashima, 1592-365 Kamifu, Oaza-Shingu, Kasuya, Fukuoka; Masanori Eshima, 1041-2, Oaza-Matsuzaki, Higashi, Fukuoka, both of Japan

[22] Filed: Sept. 25, 1975

[21] Appl. No.: 616,708

[30] Foreign Application Priority Data

| | | |
|---|---|---|
| Dec. 26, 1974 | Japan | 50-990 |
| July 2, 1975 | Japan | 50-82104 |

[52] U.S. Cl. .......... 310/81; 74/64; 181/121

[51] Int. Cl.$^2$ .......... H02K 7/06

[58] Field of Search .......... 310/81, 80, 82; 74/61, 74/64, 571; 318/114; 198/220 DB; 259/1, DIG. 41–44; 181/121, 114; 128/34–36

[56] References Cited

UNITED STATES PATENTS

| | | | |
|---|---|---|---|
| 2,592,237 | 4/1952 | Bradley | 74/571 |
| 2,611,589 | 9/1952 | Pass | 259/DIG. 41 |
| 3,757,148 | 9/1973 | Philibert | 310/81 |

FOREIGN PATENTS OR APPLICATIONS

| | | | |
|---|---|---|---|
| 244,247 | 4/1965 | Austria | 259/DIG. 41 |
| 987,033 | 8/1951 | France | 259/DIG. 42 |
| 1,335,116 | 7/1963 | France | 259/DIG. 42 |
| 1,201,805 | 8/1970 | United Kingdom | 310/81 |
| 186,882 | 10/1966 | U.S.S.R. | 259/DIG. 41 |
| 287,040 | 11/1971 | U.S.S.R. | 259/DIG. 42 |

*Primary Examiner*—R. Skudy
*Attorney, Agent, or Firm*—Frank J. Jordan

[57] ABSTRACT

A variable vibration motor includes a rotor shaft having a fixed weight and a movable weight mounted thereon. Adjustable means are provided on the motor casing for adjusting the movable weight to various rotational positions about the rotor shaft, and manually operable means outside of the motor casing are provided for adjusting the adjustable means and thereby vary the rotational position of the movable weight when the motor is running.

8 Claims, 8 Drawing Figures

VARIABLE VIBRATING MOTOR

BACKGROUND OF THE INVENTION

This invention relates to a variable vibrating motor wherein the means for effecting the vibration can be adjusted at will from the outside of the motor casing during operation of the motor.

Conventionally, vibrating motors have been used in numerous industrial fields. For example such motors are attached to conveyors and feeders which transport powders or bulky materials, or to hoppers and packers which package the above materials, or to screening apparatuses, crushers, or the like.

Generally speaking, there have been two principal methods of adjusting the force of vibration. One method is to change the number of vibrations (cycle/-sec.) and the other is to alter the amplitude of the vibrations. In the first method, the number of vibrations may be altered by changing the frequency of the supply current, by changing the voltage of the supply current, or by applying a thyrister in the electric circuit or the supply current. In the second method, the amplitude of vibration may be altered by varying the voltage of the supply current or by changing the position of the unbalancing weight relative to the stationary weight.

The present invention relates generally to the second method of altering the amplitude of vibration by adjusting the unbalancing (weight) means which usually comprises an adjustable weight and a stationary weight.

Conventionally the adjustment of the unbalancing means is performed when the motor is not in operation. Thus, in this known conventional arrangement, an operator first removes the side frame of the motor, secondly, he adjusts the adjustable weight of the unbalancing means to a degree which corresponds to the desired amplitude or force of vibration, and thirdly, he attaches the frame to the motor casing again.

Since the above adjusting operation is time-consuming and requires a good deal of manual labor, it would be desirable to provide a vibrating motor with a means by which the above adjustment could be performed easily even during the operation of the motor and which does not sacrifice performance of the motor. Accordingly, it is an object of the present invention to overcome the disadvantages of known prior art arrangements and to provide a vibrating motor with adjusting means by which the unbalancing means can be adjusted from the outside of the motor casing even during the operation of the motor, whereby the amplitude or force of vibration is easily and completely controlled.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

A variable vibration motor includes a rotor shaft having a fixed weight and a movable weight mounted thereon. Adjustable means are provided on the motor casing for adjusting the movable weight to various rotational positions about the rotor shaft, and manually operable means outside of the motor casing are provided for adjusting the adjustable means and thereby vary the rotational position of the movable weight when the motor is running.

DETAILED DESCRIPTION OF THE PREFERRED EMBODIMENTS

Figure 1:
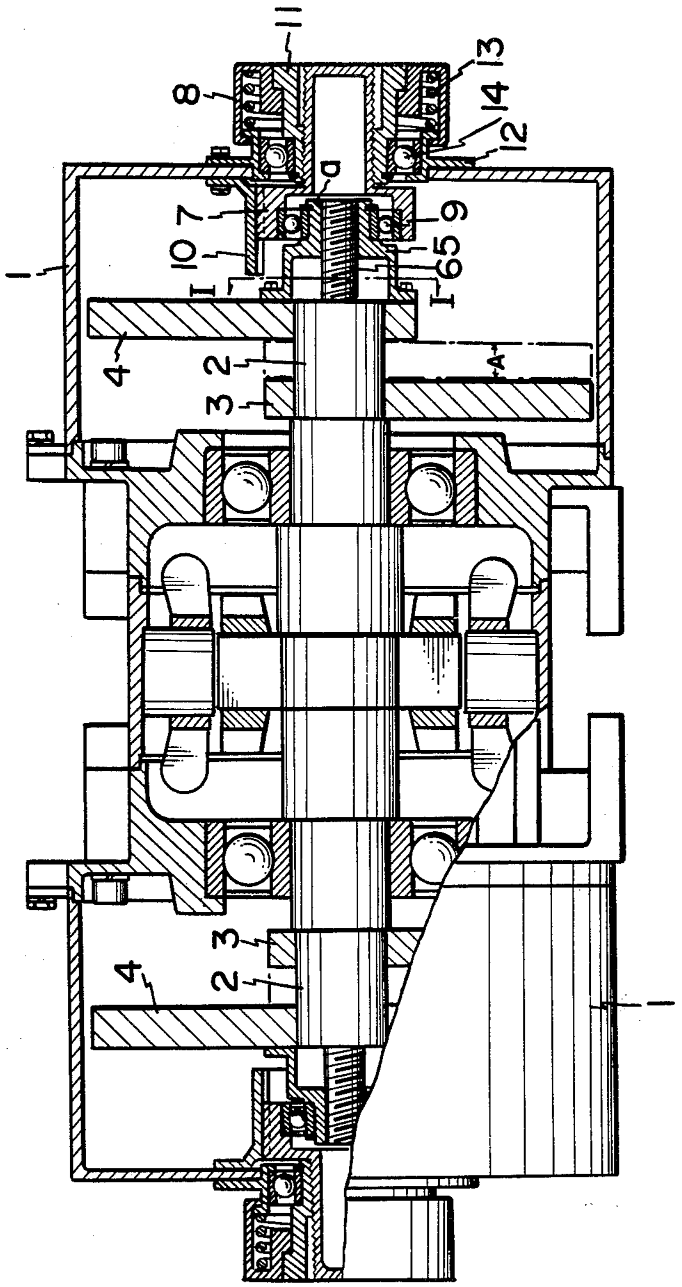
FIG. 1 is a longitudinal front view partially broken away and in section of a motor according to one embodiment of the present invention.

Referring to the right hand half of FIG. 1, numeral 1 indicates a casing in which a rotor shaft 2 is concentrically disposed. Numeral 3 indicates a fan-shaped weight which is fixedly mounted on the shaft 2 and which has one side engaged with a shoulder on the shaft 2 while numeral 4 indicates an adjustable fan-shaped weight which is rotatably mounted on the longitudinal end of the shaft 2. The unbalancing means consists of the above two weights 3 and 4.

A male threaded member 6 which is secured coaxially to the end of the rotor shaft 2 is threaded into an urging sleeve 5. The urging sleeve 5 has a radially-expanded end or flange secured to the side of the adjustable weight 4 and the other end is rotatably supported by a pusher 7 by the imposition therebetween of a radial ball bearing 9. The pusher 7 has one end threaded into a collar 11 which in turn is rotatably supported by a bearing housing 12 by the imposition of a radial ball bearing 14 therebetween. The bearing housing 12 is further fixedly mounted to the side face of the casing 1.

Numeral 10 is an L-shaped plate which has one end secured to the inner side face of the casing 1 and which is operatively connected to the pusher 7 by a tongue and groove arrangement which prohibits rotation of the pusher 7 while permitting the latter to slide longitudinally. Numeral 8 indicates a turning knob which is fixedly mounted on the collar 11 and a compression spring 13 is disposed between the knob 8 and the housing 12 to normally bias the turning knob 8 to the right as viewed in FIG. 1.

The manner in which the unbalance weight is adjusted is hereinafter described with reference to the individual operation of the parts of the motor.

Figure 2:
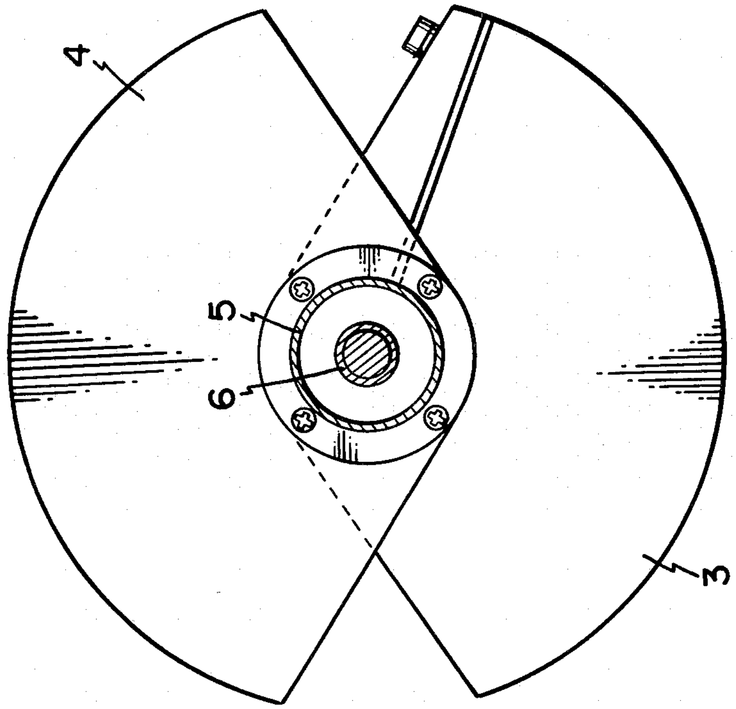
FIG. 2 is a transverse cross-sectional view of the motor in FIG. 1 taken along the line I—I in FIG. 1.
Figure 6:
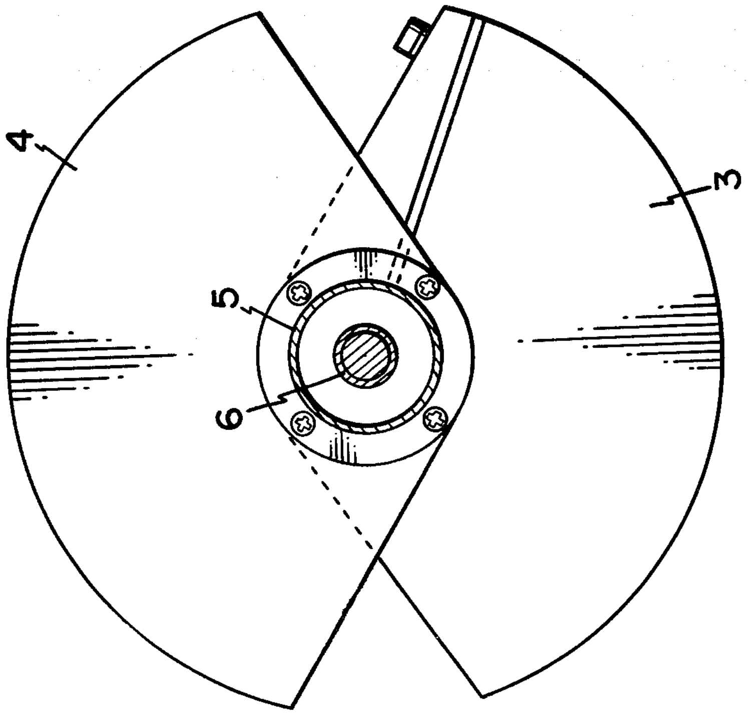
FIG. 6 is a transverse cross-sectional view of the motor in FIG. 5 taken along the line IV—IV in FIG. 5.
Figure 3B:
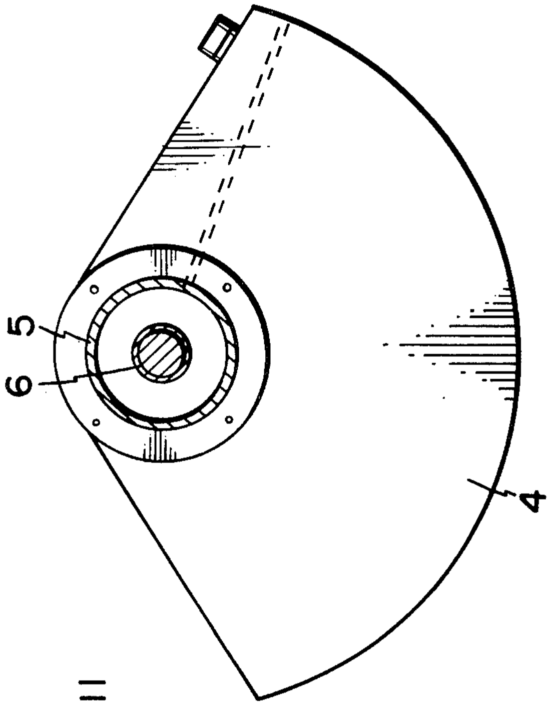
FIG. 3B is a fragmentary transverse view of the unbalancing means in FIG. 3A taken along the line II—II in Fig. 3A.
Figure 3A:
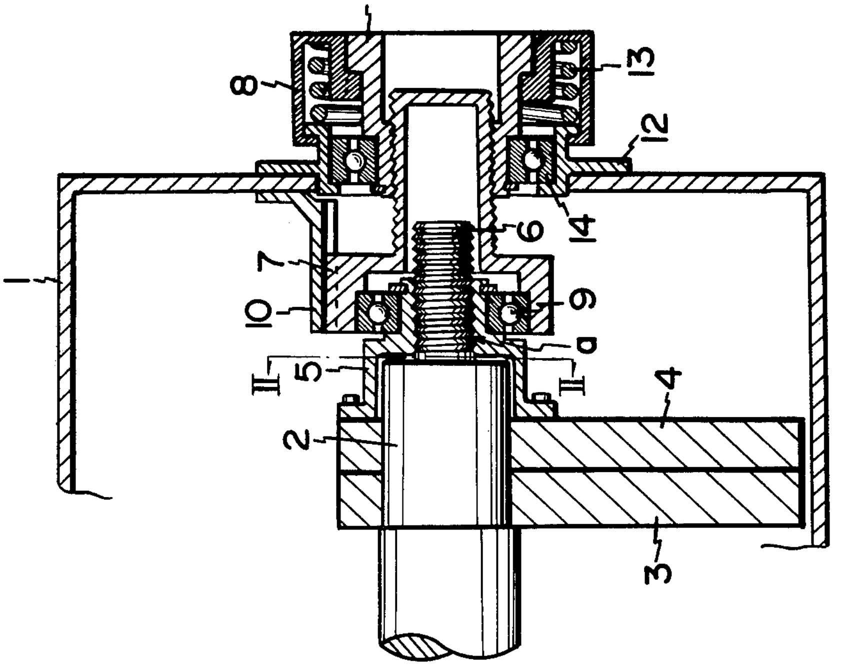
FIG. 3A is a fragmentary cross-sectional longitudinal view of the motor in FIG. 1 showing the position of the unbalance weight when the vibrating force of the motor is at a maximum.

According to the preferred embodiment of this invention as shown in FIGS. 1 and 2, the adjustable weight 4 may be initially disposed on the motor shaft 2 angularly displaced from the stationary weight 3 by 180 degrees so that the dynamic equilibrium of the motor is not changed and there is no vibration of the motor. At this time one end of the collar 11 is almost in contact with the shoulder portion of the pusher 7 as shown in FIG. 1. In order to effect vibration of the motor, the turning knob 8 is manually rotated to thereby rotate the collar 11 to which the turning knob 8 is fixed. Due to the threaded engagement between the collar 11 and pusher 7, rotation of the collar 11 will cause the pusher 7 to be moved longitudinally into the casing 1 while being guided by the previously mentioned tongue and groove arrangement between the L-shaped plate 10 and the pusher 7 in which the tongue projects from one side of the L-shaped plate 10. This pusher 7 in turn applies an axial force on the sleeve 5. Thus as the pusher 7 is moved longitudinally by the turning of the knob 8, the sleeve 5 will rotate on the threaded member 6 and will also move longitudinally because of the ball bearing 9 interposed between the pusher 7 and the sleeve 5 and also because of the threaded engagement *a* between the urging sleeve 5 and the threaded member 6. The helix angle of the screw threads *a* is chosen such that when the above axial force is applied, the urging sleeve 5 rotates relative to the threaded member 6. Therefore, the adjustable weight 4 which is fixedly secured to the radially extending portion of the urging sleeve 5 is also rotated or spirally displaced relative to the rotor shaft 2 irrespective of the rotation of the shaft 2. This action gives rise to a spiral type of angular and linear displacement of the adjustable weight 4 along the rotating shaft 2 with respect to the stationary weight 3. The relationship between the mating screw threads *a* and the longitudinal displacement A of the variable weight 4 is also chosen such that the adjustable weight 4 can be angularly displaced on the rotor shaft until it becomes juxtaposed with the stationary weight 3, wherein the amplitude or force of vibration of the motor is maximized.

Figure 4B:
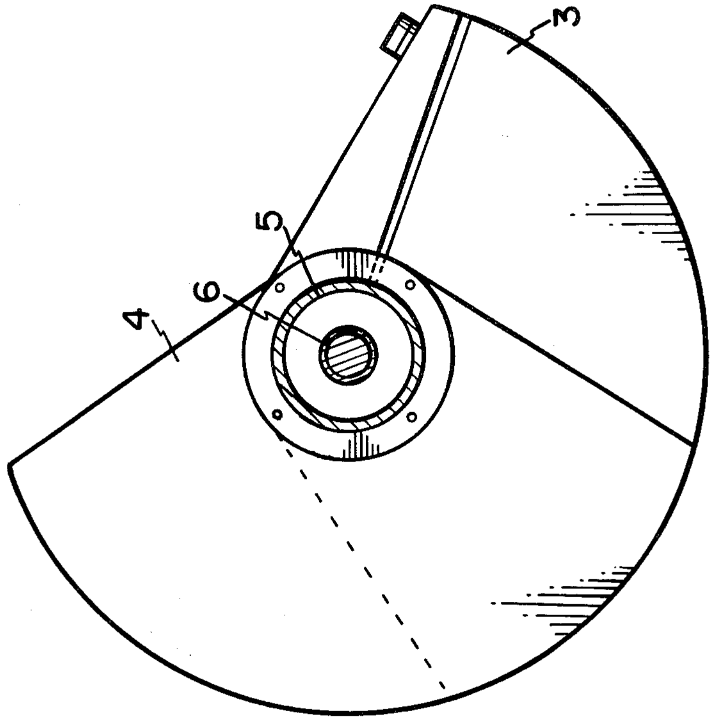
FIG. 4B is a fragmentary transverse view of the unbalancing means in FIG. 4A taken along the line III—III in FIG. 4A.
Figure 4A:
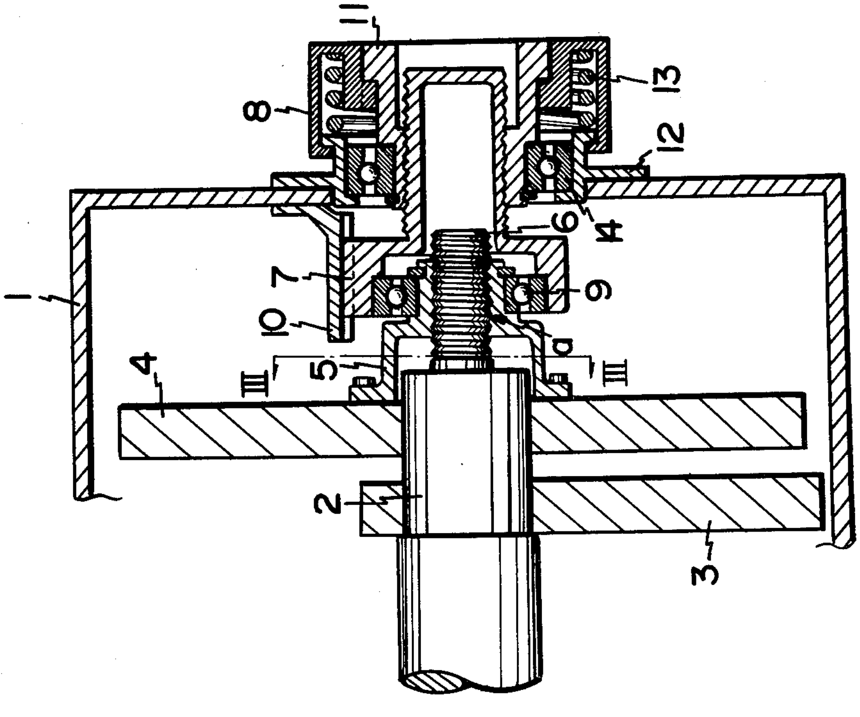
FIG. 4A is a fragmentrary cross-sectional view of the motor in FIG. 1 showing the position of the unbalance weight when the vibrating force of the motor is one-half of the amount in FIG. 3A.

FIGS. 4A and 4B show the adjustable weight 4 in a position angularly displaced by 90 degrees relative to the stationary weight 3 wherein the force of vibration of the motor is half of the above maximum value. Furthermore, the sliding movement of the pusher 7 can be initiated merely by turning the knob 8 and is completely independent of the rotation of the rotor shaft 2. Thus the knob 8 may be turned to effect adjustment either when the motor is running or when it is stopped. When the motor is running and the shaft 2 is rotating, the adjustable weight 4 rotates with the shaft 2 due to the operating connection effected by the urging sleeve 5 and the threaded engagement *a* between the urging sleeve 5 and the threaded member 6. During such rotation of the shaft 2, the urging sleeve 5 rotates on ball bearing 9 and relative rotation between the urging sleeve 5 and the threaded member 6 is precluded by the fact that longitudinal displacement of the urging sleeve 5 is precluded by the pusher 7 which is maintained in its longitudinal position, except of course, when the knob 8 is turned. When the knob 8 is turned, however, the urging sleeve 5 will be rotated relative to the threaded member 6, to thereby rotationally displace the adjustable weight 4 regardless of whether or not the motor and its shaft 2 are rotating.

According to the invention, the vibrating motor has adjusting means at both ends of the motor, each of which principally comprises a threaded member, an L-shaped plate, a collar, a bearing housing, and a turning knob which protrudes from the side of the casing frame, all as described in greater detail hereinabove. Although only the adjusting means on the right hand side of FIG. 1 has been described hereinabove in detail, it will be understood that the adjusting means on the left hand side of FIG. 1 is constructed and operated in the same manner. The adjusting means are capable of causing a spiral type of angular and linear displacement of the adjusting weight of the respective unbalancing means so that by simply rotating either of the turning knobs, the force of vibration of a motor can be altered to a desired value even though the motor is in operation.

Figure 5:
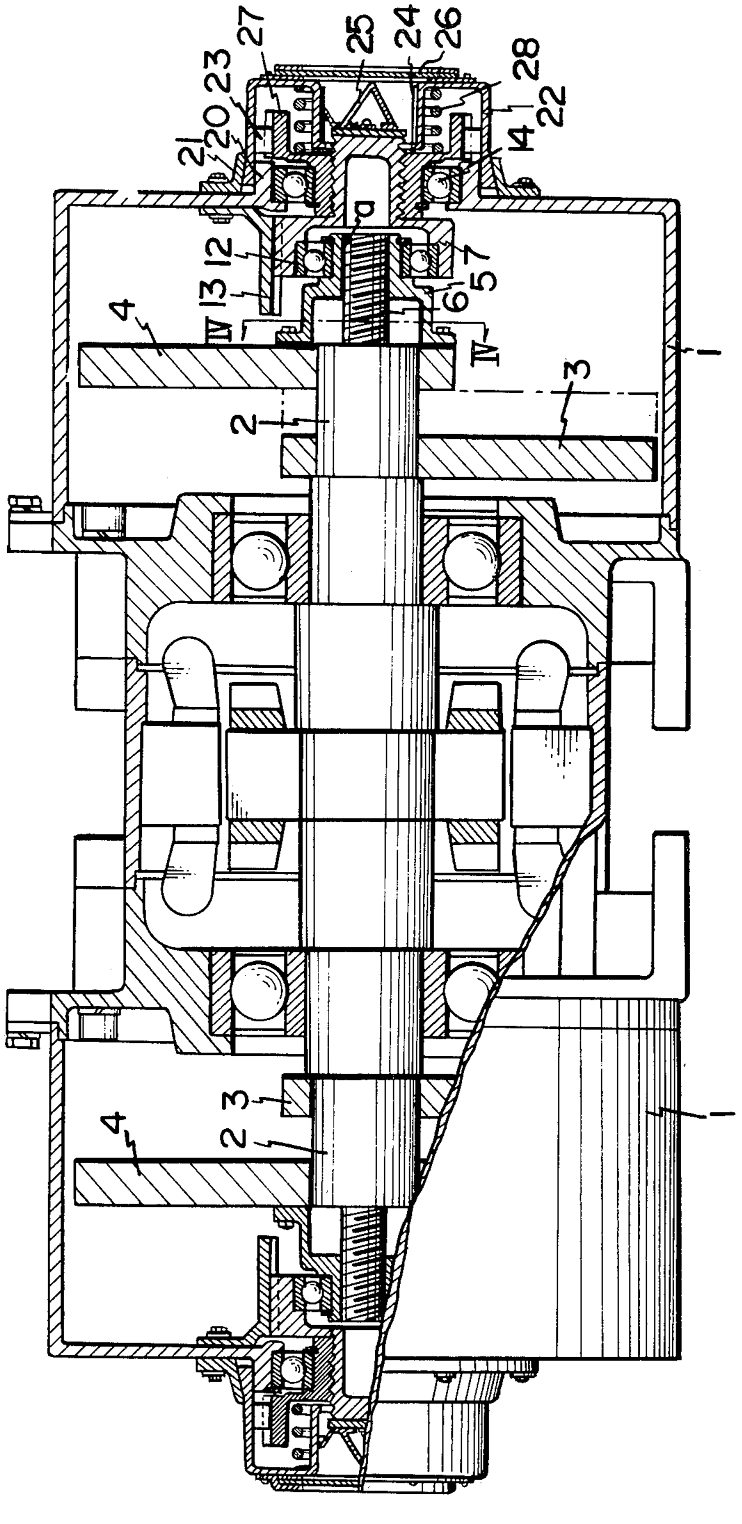
FIG. 5 is a longitudinal front view partially broken away and in sections of a motor according to a second embodiment of the present invention.

FIG. 5 shows the adjusting means of a second embodiment wherein numeral 20 indicates a housing portion which extends from the side of casing 1. Numeral 22 is a turning knob which has a wedge-shaped end rotatably disposed between the inner periphery of a flange means 21 which is fixedly secured to the side of the casing 1 and the outer periphery of the housing 20. The turning knob 22 has a plurality of lug portions 23 which engage corresponding slot portions in a collar 27 such that the collar 27 is rotated simultaneously by the rotation of the turning knob 22 while the collar 27 is free to move longitudinally relative to the turning knob 22. Numeral 28 indicates a compression spring means by which the wedge portion of the turning knob 22 is biasingly held in close contact with the flange means 21, such that the turning knob 22 is prevented from sliding off from the flange means 21. Numerals 24, 25 and 26 indicate a circular scale plate, a mirror, and an eye-hole respectively.

In this second embodiment, the manner in which the unbalance weight is adjusted is almost the same as that in the first embodiment. Thus when the turning knob 22 is rotated, the collar 27 is rotated and the pusher 7 is urged forward into the casing 1 guided by the L-shaped plate 10. As a result, the unbalancing weight 4 is spirally rotated as in the case of the first embodiment. The amount of the displacement angle of the unbalancing weight can be viewed and checked by a combination of the scale 24, the mirror 25, and the eye-hole 26 even during the operation of the motor in that it is possible to view the mirror 25 through the eye-hole 26 and the mirror in turn reflects the image of the scale 24.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. In a vibration motor comprising a casing, a rotor having a rotor shaft rotatably mounted in said casing, a fixed weight fixedly mounted on said rotor shaft, a movable weight on said rotor shaft, adjustable means on said casing for adjusting said movable weight to various rotational positions about said rotor shaft, said adjustable means comprising a male threaded member extending coaxially from the longitudinal end of said rotor shaft, an urging sleeve threadedly engaging said threaded member, means connecting said urging sleeve to said movable weight, said movable weight being rotatably and slidably mounted on said rotor shaft, and manually operable means outside of said motor casing for adjusting said adjustable means, said manually operable means being operable to rotate said urging sleeve and thereby varying the rotational position of said movable weight when the motor is running.

2. In a vibration motor according to claim 1 wherein said adjustable means further comprises a pusher element which rotatably supports said urging sleeve, engaging means mounted on said casing and engaging said pusher element to preclude rotational movement of said pusher element while permitting longitudinal displacement of said pusher element, said manually operable means threadedly engaging said pusher element such that manually initiated rotation of said manually operable means will effect longitudinal displacement of said pusher element which in turn will effect rotational and longitudinal displacement of said urging sleeve and the movable weight fixed to said urging sleeve.

3. In a vibration motor according to claim 2 wherein said manually operable means includes a bearing rotationally mounting said manually operable means on said casing.

4. In a vibration motor according to claim 2 wherein said manually operable means comprises a collar threadedly engaging said pusher element, a housing mounted on and extending from said casing, a bearing rotationally mounting said collar on said housing, and a knob mounted on said collar and extending from said housing for external manual manipulation when the motor is running or at rest.

5. In a vibration motor according to claim 2 wherein ball bearing means are provided between said pusher element and said urging sleeve for the pusher element to rotationally support said urging sleeve.

6. In a vibration motor according to claim 2 wherein said engaging means comprises a fixed element mounted on said casing, and at least one lug slidable in a groove interengaged between said fixed element and said pusher element.

7. In a vibration motor comprising a casing, a rotor having a rotor shaft rotatably mounted in said casing, a fixed weight fixedly mounted on said rotor shaft, a movable weight rotatably and slidably mounted on said rotor shaft, adjustable means on said casing for adjusting said movable weight to various rotational positions about said rotor shaft, said adjustable means comprising a male threaded member extending coaxially from the longitudinal end of said rotor shaft, an urging sleeve threadedly engaging said threaded member, means connecting said urging sleeve to said movable weight, a pusher element rotatably supporting said urging sleeve and engaging means mounted on said casing and engaging said pusher element to preclude rotational movement of said pusher element while permitting longitudinal displacement of said pusher element, manually operable means outside of said motor casing for adjusting said adjustable means and thereby varying the rotational position of said movable weight when the motor is running, said manually operable means comprising a collar threadedly engaging said pusher element, a housing mounted on and extending from said casing, a bearing rotationally mounting said collar on said housing, a knob mounted on said collar and extending from said housing for external manual manipulation when the motor is running or at rest, and a spring disposed between said housing and said knob for biasing the latter on one longitudinal direction, whereby manually initiated rotation of said knob will effect longitudinal displacement of said pusher element which in turn will effect rotational and longitudinal displacement of said urging sleeve and the movable weight fixed to said urging sleeve.

8. In a vibration motor comprising a casing, a rotor having a rotor shaft rotatably mounted in said casing, a fixed weight fixedly mounted on said rotor shaft, and a movable weight rotatably and slidably mounted on said rotor shaft, adjustable means on said casing for adjusting said movable weight to various rotational positions about said rotor shaft, said adjustable means comprising a male threaded member extending coaxially from the longitudinal end of said rotor shaft, an urging sleeve threadedly engaging said threaded member, means connecting said urging sleeve to said movable weight, a pusher element rotatably supporting said urging sleeve, and engaging means mounted on said casing and engaging said pusher element to preclude rotational movement of said pusher element while permitting longitudinal displacement of said pusher element, manually operable means outside of said motor casing for adjusting said adjustable means and thereby varying the rotational position of said movable weight when the motor is running, said manually operable means comprising a collar threadedly engaging said pusher element, a housing mounted on and extending from said casing, a bearing rotationally mounting said collar on said housing, a knob mounted on said collar and extending from said housing for external manual manipulation when the motor is running or at rest, whereby manually initiated rotation of said knob will effect longitudinal displacement of said pusher element which in turn will effect rotational and longitudinal displacement of said urging sleeve and the movable weight fixed to said urging sleeve, a scale mounted on said housing, and mirror means mounted on said pusher element arranged such that the mirror means reflects said scale to provide for viewing of the scale and thereby provide an indication of the rotational position of said movable weight on said rotor shaft.

* * * * *